US009989373B2

(12) United States Patent
Uyeki

(10) Patent No.: US 9,989,373 B2
(45) Date of Patent: Jun. 5, 2018

(54) COVERAGE BASED DEMAND RESPONSE SIGNALS

(71) Applicant: Honda Motor Co., Ltd., Tokyo (JP)

(72) Inventor: Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 15/134,431

(22) Filed: Apr. 21, 2016

(65) Prior Publication Data

US 2017/0307390 A1  Oct. 26, 2017

(51) Int. Cl.
G01C 21/34 (2006.01)
G05B 15/02 (2006.01)
G07C 5/00 (2006.01)
H04L 29/08 (2006.01)

(52) U.S. Cl.
CPC ......... *G01C 21/3469* (2013.01); *G05B 15/02* (2013.01); *G07C 5/008* (2013.01); *H04L 67/12* (2013.01)

(58) Field of Classification Search
CPC .... G01C 21/3469; G05B 15/02; G07C 5/008; H04L 67/12
See application file for complete search history.

(56) References Cited

U.S. PATENT DOCUMENTS

| 7,956,570 | B2 | 6/2011 | Lowenthal et al. |
| 8,024,073 | B2 | 9/2011 | Imes et al. |
| 8,412,654 | B2 | 4/2013 | Montalvo |
| 8,509,976 | B2 | 8/2013 | Kempton |
| 8,798,804 | B2 | 8/2014 | Besore et al. |
| 8,825,215 | B2 | 9/2014 | Boot |
| 9,113,514 | B2 | 8/2015 | Wang et al. |
| 9,125,010 | B2 | 9/2015 | Meyerhofer et al. |
| 9,171,256 | B2 | 10/2015 | Mohagheghi et al. |
| 2009/0030712 | A1 | 1/2009 | Bogolea et al. |
| 2012/0053746 | A1 | 3/2012 | Drake et al. |
| 2013/0110296 | A1 | 5/2013 | Khoo et al. |
| 2013/0110970 | A1 | 5/2013 | Meyerhofer et al. |
| 2013/0325997 | A1 | 12/2013 | Higgins et al. |
| 2014/0095943 | A1* | 4/2014 | Kohlenberg ............ H04L 29/08 714/47.3 |
| 2015/0170171 | A1 | 6/2015 | McCurnin et al. |
| 2015/0183333 | A1 | 7/2015 | Forbes, Jr. et al. |
| 2016/0126735 | A1* | 5/2016 | Chan ..................... F02B 63/04 307/105 |
| 2017/0176195 | A1* | 6/2017 | Rajagopalan ...... G01C 21/3415 |

* cited by examiner

Primary Examiner — Michael D Lang
(74) Attorney, Agent, or Firm — Rankin, Hill & Clark LLP

(57) ABSTRACT

According to one or more aspects, demand response (DR) management for an electric vehicle (EV) may be provided as follows. A current location and a destination location for the EV may be received. A determination as to whether the EV is eligible to participate in a DR event may be made. A travel route from the current location to the destination location may be analyzed to determine whether it is associated with a non-coverage area where a telematics control unit (TCU) of the EV has limited connectivity with an original equipment manufacturer (OEM) server. The DR signal may be transmitted as a DR request based on the EV having current coverage along the travel route and the EV travelling towards the non-coverage area such that an anticipated loss of signal or coverage may occur.

20 Claims, 6 Drawing Sheets

COVERAGE BASED DEMAND RESPONSE SIGNALS

BACKGROUND

As the population grows and the number of electronic devices used per consumer increases, power consumption increases accordingly. While utility companies, such as electric utilities, may increase the supply of electricity by bringing additional generators online, there are limits as to what may be achieved on the utility side of the supply and demand for electric power. In this regard, a demand response (DR) signal may be sent to consumers (e.g., in association with their electronic devices), requesting their participation in a demand response event. During the demand response event, a participating consumer (e.g., a consumer who has opted into the demand response event) may change power consumption or usage, such as by postponing tasks that would otherwise require electric power.

By postponing these tasks, the load on the electric utility may be reduced. In other words, participation in the demand response event enables utilities to adjust the demand for electric power rather than adjusting the supply for electric power. Participation in the demand response event may be verified by a sub-meter on location. Consumers may be compensated for their participation in the demand response event, such as with incentives or reduced rates, for example. However, if demand response signals are not received, this may result in the consumer being unable to participate in the demand response event, costing the consumer their incentives and the utility company an additional load on the electric grid, which is undesirable during the demand response event.

BRIEF DESCRIPTION

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one or more aspects, a method for managing demand response (DR) for an electric vehicle (EV) may include receiving a current location and a destination location for the EV, determining whether the EV is eligible to participate in a DR event, determining whether a travel route from the current location to the destination location is associated with a non-coverage area where a telematics control unit (TCU) of the EV has below a threshold level of connectivity with an original equipment manufacturer (OEM) server such that the EV cannot receive a DR signal therefrom, and transmitting the DR signal as a DR request based on the EV being eligible to participate in the DR event, the EV having current coverage along the travel route, and the EV travelling towards the non-coverage area. The DR signal includes DR information associated with the DR event.

According to one or more aspects, a system for managing demand response (DR) for an electric vehicle (EV) includes a coverage module and a DR module. The coverage module receives a current location and a destination location for the EV. The coverage module determines whether a travel route from the current location to the destination location is associated with a non-coverage area where a telematics control unit (TCU) of the EV has limited connectivity with an original equipment manufacturer (OEM) server such that the EV cannot receive a DR signal therefrom. The DR signal includes DR information associated with a DR event. The DR module determines whether the EV is eligible to participate in the DR event. The DR module transmits the DR signal as a DR request based on the EV being eligible to participate in the DR event, the EV having current coverage along the travel route, and the EV travelling towards the non-coverage area.

According to one or more aspects, a method for managing demand response (DR) for an electric vehicle (EV) includes determining a current location and a destination location for the EV and receiving a DR signal as a DR request based on the EV being eligible to participate in a DR event, the EV having current coverage along a travel route from the current location to the destination location, and the EV travelling towards a non-coverage area where a telematics control unit (TCU) of the EV has limited connectivity with an original equipment manufacturer (OEM) server.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

An electric utility company may send or transmit a demand response (DR) signal indicating that the electric utility desires consumers to reduce their load on the electric grid at a predetermined time, such as by postponing tasks that would otherwise require electric power. In particular, the electric utility may transmit a DR signal indicative of a DR event where Plug-in Hybrid Electric Vehicles (PHEV) or electric vehicles (EV) are requested to refrain or postpone charging during one or more predetermined times or time windows. Often, this may be done with user or consumer approval, thus giving the user a chance to opt-in (e.g., participate) or opt-out (e.g., decline participation) of the DR event. Although portions of this disclosure are described with reference to PHEVs, the concepts disclosed herein are applicable to EVs as well.

Figure 1:
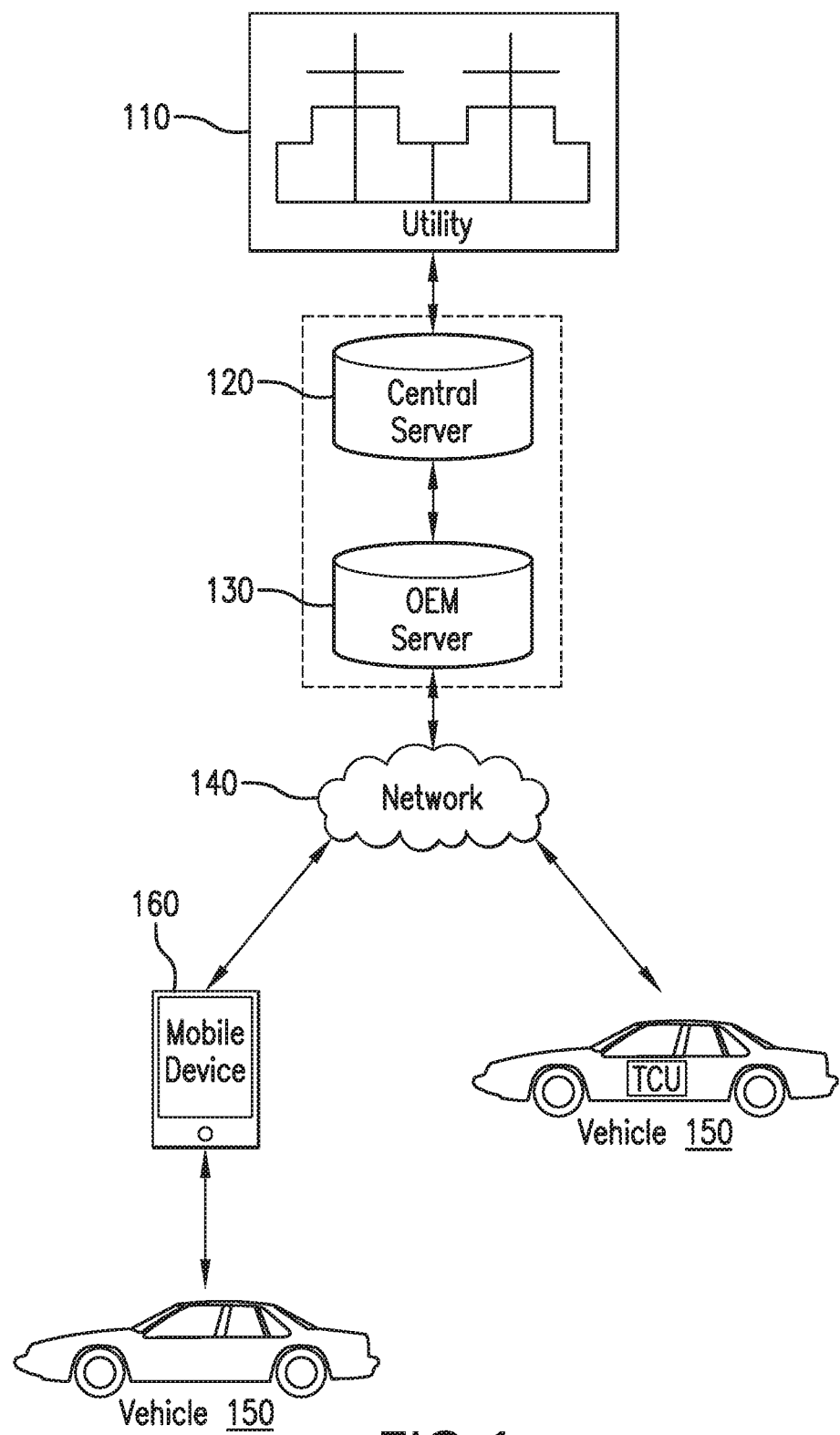
FIG. 1 is an illustration of an example component diagram of an open vehicle grid integration platform (OVGIP) architecture where coverage based demand response (DR) is implemented in accordance with one embodiment.

With reference to FIG. 1, a utility company 110 may originate a request for a DR event by generating a DR signal at a central server 120, which may communicate the DR signal to an original equipment manufacturer (OEM) server 130, which then transmits the DR signal directly or indirectly to a Plug-in Hybrid Electric Vehicle (PHEV) 150. For example, the PHEV 150 may be communicatively coupled to the OEM server 130 across a network 140 through a telematics control unit (TCU) or a transmitter/receiver of the PHEV 150. Alternatively, the PHEV 150 may communicate with the OEM server 130 using a mobile device 160, such as a smartphone or cell phone, as an intermediary. Here, the mobile device 160 may utilize an installed application or 'app' to provide a user with an interface to accept or decline DR event requests. In other words, when the mobile device 160 receives the DR signal, the DR signal may be presented to a user as a DR request via an interface rendered by the mobile device 160.

However, because communication between the OEM server 130 and the PHEV 150 may be intermittent due to the mobility of vehicles, the OEM server 130 may transmit the DR signal to the PHEV 150 based on an anticipated lack of coverage. For example, the OEM server 130 may transmit the DR signal to the PHEV 150 prior to the PHEV 150 entering a non-coverage or a low coverage area (e.g., measured by a signal strength threshold or signal to noise ratio (SNR or S/N) threshold). In other words, the OEM server 130 may transmit the DR signal for the DR event while the PHEV 150 is in a coverage area where signal strength is above a signal strength threshold for the PHEV 150 or the associated mobile device 160 rather than at ignition on, at ignition off, or at predetermined intervals.

In this way, when the PHEV 150 is outside of the coverage area (e.g., in an underground parking garage, in an area with spotty coverage, etc.), the PHEV 150 is capable of participation in the DR event, thereby providing the user or driver of the PHEV 150 with an opportunity to gain an incentive from the utility company 110 and providing the utility company 110 with an opportunity to reduce additional load on the power grid. Stated another way, the OEM server 130 may transmit DR signals to the PHEV 150 based on coverage associated with the PHEV 150 or coverage associated with the mobile device 160 linked to the PHEV 150. Thus, this coverage based transmission of the DR signal enables the PHEV 150 to receive DR signals, taking into account when a signal or coverage (e.g., the DR signal) may be lost or based on the signal strength threshold.

Coverage may not necessarily be based on global positioning system (GPS) coordinates or a location of a vehicle, for example, a vehicle may be parked in an underground parking deck or in a garage where coverage is available outside, but not inside the parking deck or garage. In this way, two users may experience different coverages for the same area, location, or GPS coordinates. For example, a first user driving a first PHEV may park on a surface lot where coverage exists, and thus have no connectivity issues with the OEM server 130. Continuing with this example, a second user driving a second PHEV may park in an underground lot under the surface lot which has no or weak connectivity with the OEM server 130. In this regard, the OEM server 130 may track and correlate one or more locations with coverage or signal strength for the respective users to determine where coverage exists for each user or otherwise determine coverage patterns for respective users.

In this way, the OEM server 130 may account for the loss of signal or loss of coverage for the second user and the second PHEV. Because the second PHEV is in the underground lot having no connectivity or coverage, the second PHEV would be unable to receive the DR signal from the OEM server 130 or transmit trace data or charging data to the OEM server 130 over the network 140 during that time. As a result, at ignition off (or the following ignition on) for the second PHEV 150 in the underground lot, no data could be communicated between the second PHEV 150 and the OEM server 130. In one or more embodiments, the OEM server 130 may transmit the DR signal to the second PHEV prior to the second PHEV entering the underground lot based on the coverage pattern associated with the second PHEV. Further, based on the coverage pattern of the first PHEV, the OEM server 130 would know that it would not be necessary to transmit the DR signal to the first PHEV, despite being associated with the same destination coordinates or location as the second PHEV.

Figure 2:
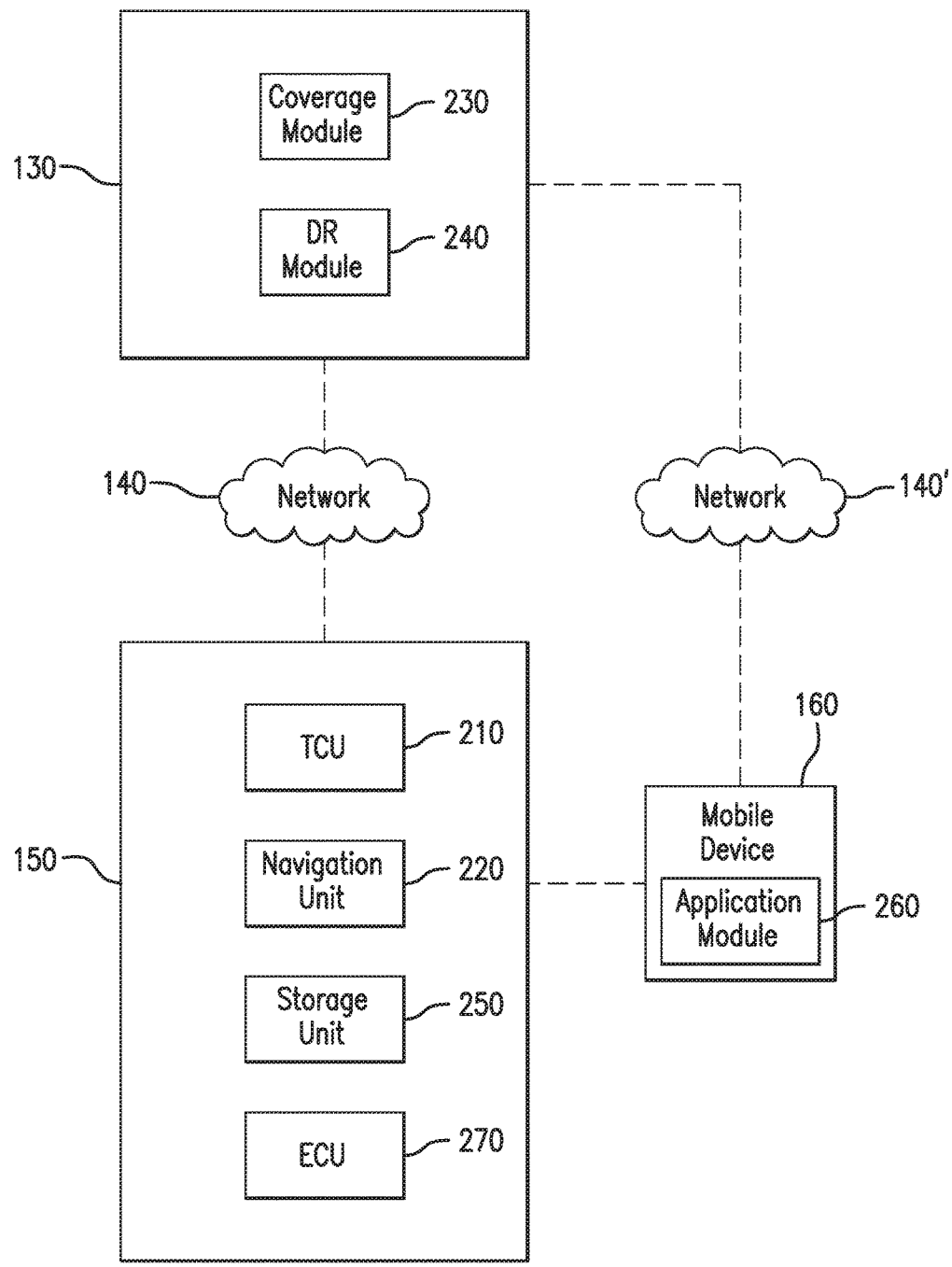
FIG. 2 is an illustration of an example component diagram of an open vehicle grid integration platform (OVGIP) architecture where coverage based demand response (DR) is implemented in accordance with one embodiment.

FIG. 2 is an illustration of an example component diagram of an open vehicle grid integration platform (OVGIP) architecture where coverage based demand response (DR) is implemented. In FIG. 2, a TCU 210 of the PHEV 150 may receive a current location for the PHEV 150. A navigation unit 220 may receive a destination location and derive route information, such as a proposed travel route from the current location to the destination location. The navigation unit 220 may include a display and interface (e.g., touchscreen, buttons, keypad, microphone, etc.) which receives inputs from the user or an occupant of the vehicle, including a desired destination or destination location. Alternatively, the application module 260 of the mobile device 160 may execute a navigation app or application which receives the destination location. This information may be passed between the mobile device 160 and the PHEV 150 via a wireless protocol, a wired connection, etc. A coverage module 230 of the OEM server 130 may determine whether the travel route is associated with a non-coverage area where the TCU 210 has no or limited connectivity (e.g., below a threshold level of connectivity) with the OEM server 130 (such that the PHEV 150 cannot or is unlikely receive the DR signal from the OEM server 130).

A DR module 240 of the OEM server 130 may manage transmission of the DR signal. The DR signal received from the central server 120 may include one or more DR criteria which are indicative of conditions as to whether the PHEV 150 is eligible to participate in the DR event. For example, the DR module 240 may determine a timing as to when the DR signal is sent or transmitted to the PHEV 150. This may be based on the current location of the PHEV 150 and the location of the non-coverage area. In one or more embodiments, the DR module 240 transmits the DR signal to the PHEV 150 based on the PHEV 150 being eligible to participate in the DR event, the PHEV 150 having current coverage along the travel route, and the PHEV 150 travelling towards the non-coverage area. In other words, the DR module 240 may transmit the DR signal based on coverage for the PHEV 150, which may be determined by the coverage module 230 according to historical coverage patterns, crowd sourcing, provider coverage maps, etc.

With continued reference to FIG. 2, the coverage module 230 of the OEM server 130 may track and correlate one or more locations of the PHEV 150 with coverage or signal strength and determine coverage patterns for a user or the PHEV 150. A coverage pattern may be determined or tracked based on a day of the week, a time of day, a location of the PHEV 150, and a signal strength or SNR at the location. In this way, the coverage module 230 of the OEM server 130 may track and determine when and where the PHEV 150 has coverage or sufficient signal strength to receive the DR signal and when and where there is no coverage to receive the DR signal. The coverage module 230 may be implemented via a processing unit and/or a memory, as will be described with references to FIGS. 6 and 7.

The location of the PHEV 150 may be provided by the TCU 210 of the PHEV 150. The TCU 210 may include a GPS device which tracks the location of the PHEV 150, a processor, a memory, and a mobile communication unit which may enable the TCU 210 to communicate over the network 140 with the OEM server 130 or with other components of the PHEV 150 (e.g., access information from a controller area network (CAN) bus). Further, the memory of the TCU 210 may record the signal strength (e.g., measured by the TCU 210, in relation to the network 140 or 140') at different locations for the PHEV 150 and store these in the storage unit 250. Additionally, this information may be communicated to the coverage module 230 of the OEM server 130 by the mobile communication unit of the TCU 210. Thus, the TCU 210 of the PHEV 150 may determine whether the PHEV 150 is in a coverage area and provide this information to the coverage module 230, which 'maps' the coverage pattern for the user or PHEV 150. Thus, the coverage module 230 may receive location data and signal data from the TCU 210 or the storage unit 250 of the PHEV 150 and generate coverage maps for one or more users indicative of coverage patterns (e.g., times or days of the week when coverage may be weaker or locations where coverage is weaker).

In one or more embodiments, the mobile device 160 may be used as an intermediary or to facilitate approval of participation in the DR event, whereby the mobile device 160 may accept or receive the DR signal on behalf of the PHEV 150 (e.g., and transmit a corresponding response to the DR request). For example, the mobile device 160 may have an application module 260 which runs or executes a program providing an interface which enables a user to accept or decline the DR request associated with the DR event when the DR signal is received. The program or application may be linked to the PHEV 150 such that DR signals may be transmitted to the mobile device 160 rather than the PHEV 150. Thus, the mobile device 160 may provide responses to the OEM server 130 for the PHEV 150, such as based on manual user input or automatically, based on user profile settings, for example.

Further, the mobile device 160 may have its own GPS unit which may be used to provide the location of the mobile device 160 (and thus the location of the associated PHEV 150) to the coverage module 230 of the OEM server 130 over another network 140'. The network 140' may, for example, be a cellular network, a wireless network, etc. When the mobile device 160 is used as the intermediary for approval of DR events, the coverage module 230 of the OEM server 130 may track the location and corresponding signal strength (e.g., cellular coverage) associated with the mobile device 160 rather than for the TCU 210 over the network 140 to the OEM server 130.

When the PHEV 150 is travelling to a non-coverage area (e.g., an area where the TCU 210 of the PHEV 150 or the mobile device 160 have no reception or a low signal strength below a signal strength threshold), it may be desirable to provide the PHEV 150 with the DR signal ahead of time, prior to the PHEV 150 entering the non-coverage area. Here, the DR module 240 of the OEM server 130 may have already received the DR signal from the central server 120. The DR signal may include DR information such as a location, a date, a time, a duration of the DR event, etc. Accordingly, the DR module 240 may store the DR information and propagate the DR signal to different PHEVs based on available coverage and eligibility of the PHEV 150 for the corresponding DR event. In this way, the DR module 240 of the OEM server 130 may transmit the DR signal to the PHEV 150 in an on-coverage or an instant access type manner, rather than transmitting to the PHEV 150 at ignition on, ignition off, or during predetermined time intervals.

The DR module 240 of the OEM server 130 may have a storage drive or memory for storing the DR information as well as a transmitter or a communication port which enables the OEM server 130 to transmit information or signals, such as the DR signal across the network 140 or other network 140'. Further, the DR module 240 may receive responses to DR requests or DR signals from different PHEVs as well as verification that the PHEV 150 has participated in the DR event.

Figure 3:
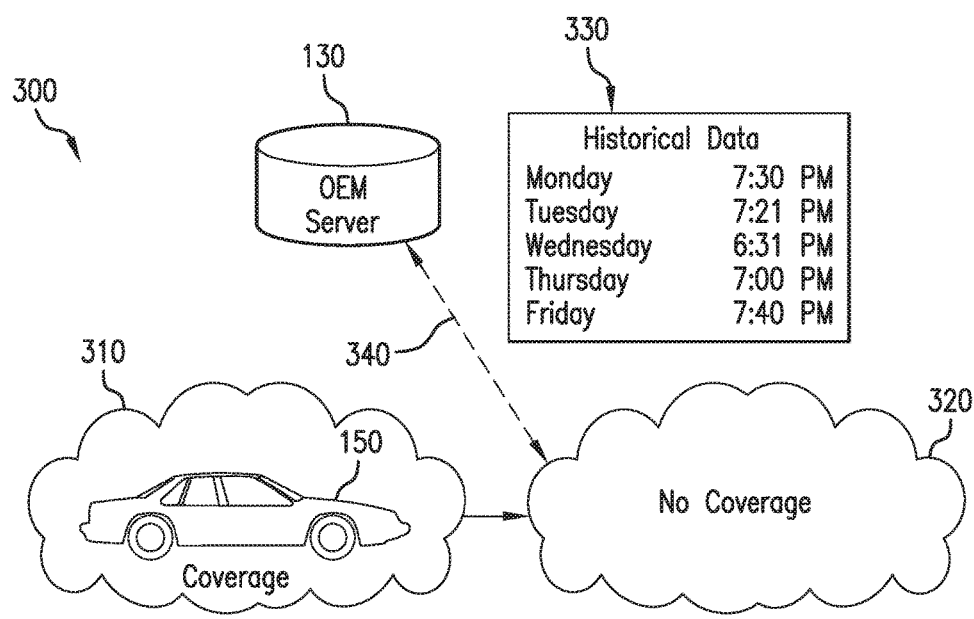
FIG. 3 is an illustration of an example component diagram of an open vehicle grid integration platform (OVGIP) architecture where coverage based demand response (DR) is implemented in accordance with one embodiment.

In one or more embodiments, the DR module 240 of the OEM server 130 may transmit the DR signal based on the coverage pattern of the PHEV 150. With reference to FIG. 3, historical data 330 may be used to determine the coverage pattern for the PHEV 150. For example, it can be seen that the PHEV 150 generally loses coverage 310 at 7:00 PM on Thursdays by entering a non-coverage area 320 around that time. When the PHEV 150 enters the non-coverage area 320, transmission of data 340 between the PHEV 150 and the OEM server 130 is unlikely or impossible, as indicated by the dashed line of FIG. 3.

Figure 4:
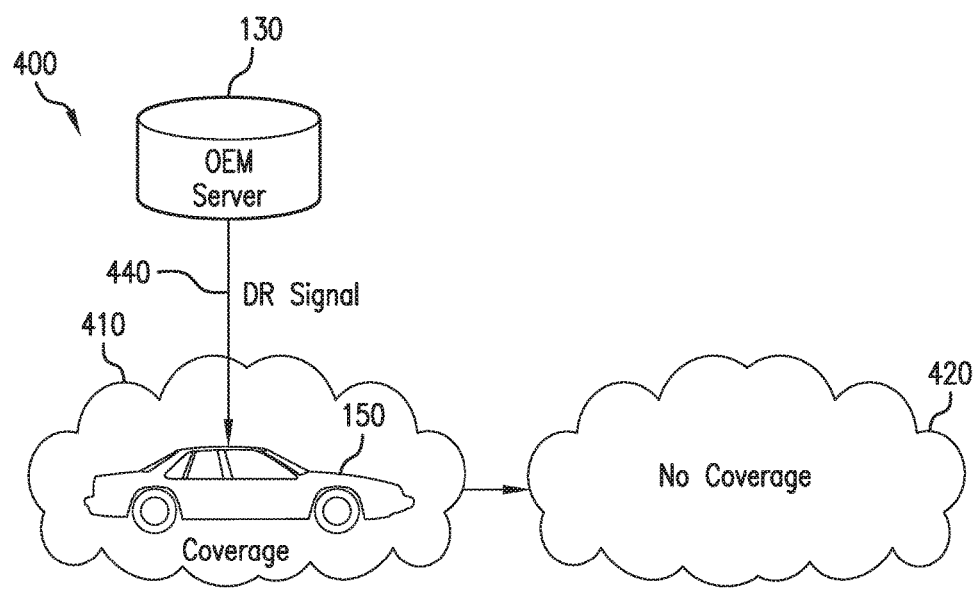
FIG. 4 is an illustration of an example component diagram of an open vehicle grid integration platform (OVGIP) architecture where coverage based demand response (DR) is implemented in accordance with one embodiment.

Therefore, as seen in FIG. 4, the OEM server 130 (or DR module 240) may transmit the DR signal 440 to the PHEV 150 at 6:00 PM on Thursdays, an hour ahead of the time prior to (e.g., while the PHEV 150 still has coverage 410) when the signal or coverage is usually lost 420. The DR module 240 may thus manage the timing of transmission of the DR signal 440 based on an anticipated loss of signal or coverage.

The DR module 240 may transmit the DR signal to the PHEV 150 based on other indicia that the PHEV 150 will or is planning on entering a non-coverage area. For example, the coverage module 230 may determine non-coverage areas based on location (e.g., a dead zone, an underground parking garage), a coverage map from a service provider (e.g., provided by a telecommunications company), a coverage map created by crowd sourcing, using the historical travel data or travel patterns, based on an anticipated destination location or an anticipated travel route provided by the navigation unit 220 of the PHEV 150 or navigation using a navigation application on the mobile device 160. In other words, if the destination location of the PHEV 150 is in a non-coverage area or involves travel through a non-coverage area and the current location of the PHEV 150 is in a covered area, the DR module 240 may transmit the DR signal at the current time. If the travel path or travel route of the PHEV 150 crosses the non-coverage area, the DR module 240s may transmit the DR signal at the current time or at a time prior to the PHEV 150 entering the non-coverage area.

Thus, the DR module 240 of the OEM server 130 may manage the timing of the transmission of the DR signal to EVs, such as the PHEV 150 based on an anticipated loss of signal coverage (e.g., determined by the coverage module 230). As discussed, loss of coverage may occur in good coverage areas, such as when a vehicle enters a garage which is underground or enters a parking deck, for example. In one or more embodiments, the DR module 240 may transmit the DR signal when coverage is adequate or sufficient, such as when signal strength is above a signal strength threshold or based on a SNR threshold. In other embodiments, the DR module 240 may transmit the DR signal based on an anticipated loss of signal, regardless of the signal strength. In other words, the OEM server 130 may transmit the DR information or the DR signal to the PHEV 150 while the PHEV 150 has appropriate coverage. This may be triggered merely when the PHEV 150 has coverage or when the PHEV 150 is travelling to a destination where coverage is known to be weak.

The storage unit 250 of the PHEV 150 may receive the DR information associated with the DR signal upon receipt from the OEM server 130. At this point, the application module 260 of the mobile device 160 may provide the user with an interface which renders details of the proposed DR event, such as incentives to be earned if the user participates or opts in, an opt-in option, an opt-out option, costs or penalties associated with opting out, etc. Again, the DR information may include a location, a date, a time, a duration of the DR event, usage information, corresponding instructions (e.g., plug the EV or PHEV 150 into the power grid to enable the PHEV 150 to be used as a vehicle to grid power supply). In any event, the storage unit 250 of the PHEV 150 may store the DR information associated with the DR event or DR signal. The storage unit 250 may, for example, have an on-board memory unit, and further facilitate participation in the DR event, such as by stopping or starting charging at appropriate times indicated by the DR information, even when external communication (e.g., across the network 140, 140' or with the OEM server 130) is not possible, such as in the underground parking garage scenario.

Returning to FIG. 2, the electronic control unit (ECU) 270 of the PHEV 150 may cross reference the DR information as criteria for initiating participation in the DR event. For example, the ECU 270 may verify the location of the PHEV 150 (e.g., check to see whether the PHEV 150 is in a DR territory), check whether the DR event timing is correct, or determine whether the user has opted into the DR event prior to engaging the PHEV 150 in DR event behavior, such as delaying charging, or using the PHEV 150 as a power source in a vehicle to power grid (V2G) scenario. In this way, the ECU 270 may verify the DR information as DR event criteria prior to enabling the PHEV 150 to participate in the DR event.

The ECU 270 may include a core having a processor or processing unit (e.g., microcontroller), a memory, etc. and control systems or subsystems of the PHEV 150, including managing the charging behavior of the PHEV 150 during DR events, for example.

In this regard, once the ECU 270 verifies that appropriate DR criteria (derived from the DR information) has been met and that the user has opted into the DR event (e.g., either by manually accepting the DR request or automatically based on profile settings), the ECU 270 may coordinate or manage participation of the PHEV 150 in the DR event. For example, the ECU 270 may manage a delay of charging of the PHEV 150 according to the DR information or cause the PHEV 150 to supply power to the grid based on the DR information.

The ECU 270 may have the storage unit 250 verify participation in the DR event by storing trace data associated with the DR event, such as ignition on data, ignition off data, a GPS location of the PHEV 150, a state of charge prior to charging, a state of charge after charging, a start or stop charge time, date, time, location, duration of charge or delay, voltages associated with a battery of the PHEV 150 or cells of the battery, magnitudes of voltages, a status of the PHEV, etc.

In one or more embodiments, the TCU 210 may transmit this trace data to the OEM server 130 as verification that the PHEV 150 has participated in the DR event once the PHEV 150 enters a coverage area. In other embodiments, the TCU 210 may hand the trace data off to the mobile device 160 which may use the other network 140' (e.g., a wireless network) to transmit the trace data to the DR module 240 of the OEM server 130 in order to verify the PHEV's 150 participation in the DR event. In this way, trace data may be used to double check or verify participation in the DR event prior to awarding an incentive to a user or consumer.

Alternatively, a sub-meter (not shown) may verify participation by the PHEV 150 in the DR event. Here the TCU 210 may communicate the trace data through Electric Vehicle Supply Equipment (EVSE) to the sub-meter, across an EVSE network and to the utility company 110.

According to one or more other embodiments, with reference to FIGS. 2 and 4, vehicles may communicate or propagate the DR signal 440 among themselves utilizing vehicle to vehicle (V2V) communication, for example. In other words, if a first vehicle (e.g., vehicle 150) travels between the coverage area 410 and the non-coverage area 420, that vehicle 150 may utilize V2V communication to relay a received DR signal 440 to a second vehicle (not shown in FIG. 4) in the non-coverage area 420. For example, the TCU 210 (or mobile communication unit thereof) of the first vehicle 150 may transmit the DR signal 440, which is stored locally on the storage unit 250, to a receiver of a TCU of a second vehicle (not shown in FIG. 4). In this way, vehicles may act as communication nodes in a vehicular communication network and the respective vehicles or TCUs thereof may act as dedicated short range communication (DSRC) devices, facilitating transmission and propagation of the DR signal (once received by one or more vehicles in the coverage area 410) to vehicles in the non-coverage area 420.

Figure 5:
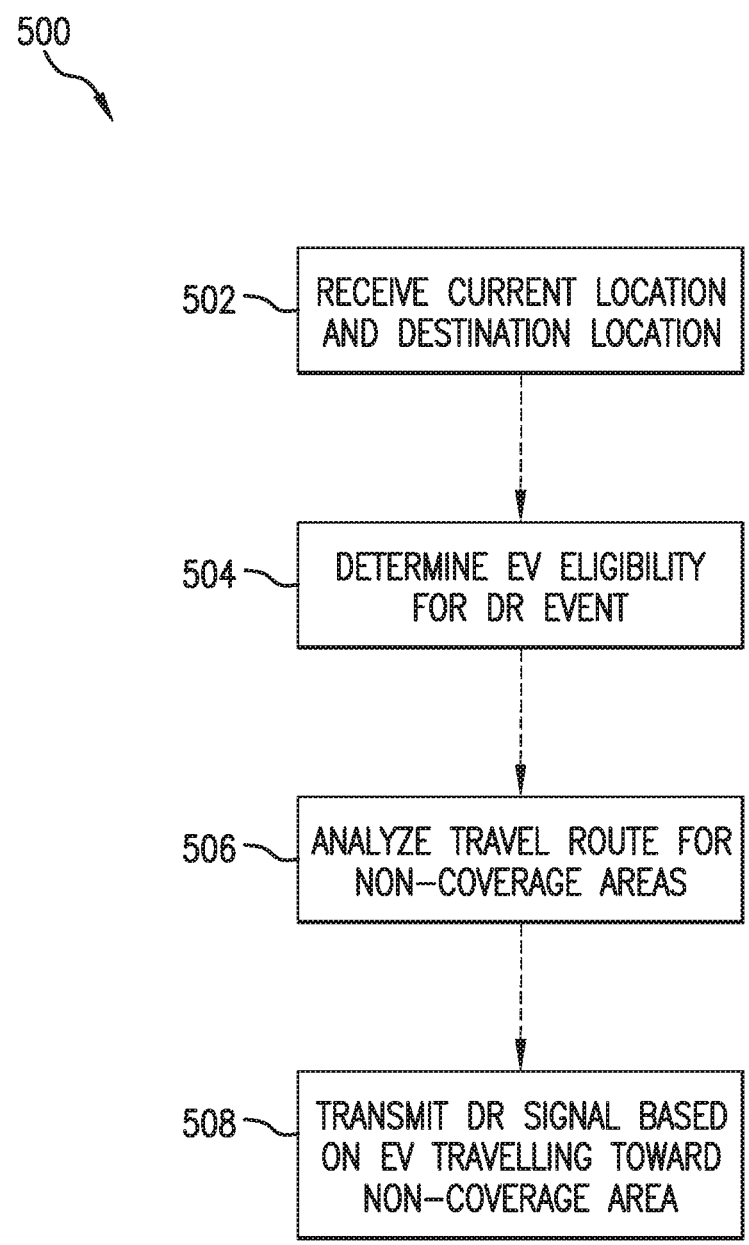
FIG. 5 is an illustration of an example flow diagram of a method for providing coverage based demand response (DR) signals in accordance with one embodiment.

FIG. 5 is an illustration of an example flow diagram of a method 500 for providing coverage based DR signals. At 502, a current location and a destination location for the PHEV may be received. At 504, a determination may be made as to whether the EV is eligible to participate in a DR event. At 506, the travel route may be analyzed to determine whether the route is associated with a non-coverage area where the TCU of the EV has limited connectivity with the OEM server such that the EV cannot or is unlikely to receive a DR signal therefrom. At 508, the DR signal is transmitted based on the EV being eligible to participate in the DR event, the EV having current coverage along the travel route, and the EV travelling towards the non-coverage area.

In other embodiments, other methods may include determining a current location and a destination location for the EV and receiving a DR signal as a DR request based on the EV being eligible to participate in a DR event, the EV having current coverage along a travel route from the current location to the destination location, and the EV travelling towards a non-coverage area where the TCU of the EV has limited connectivity with the OEM server.

Figure 6:
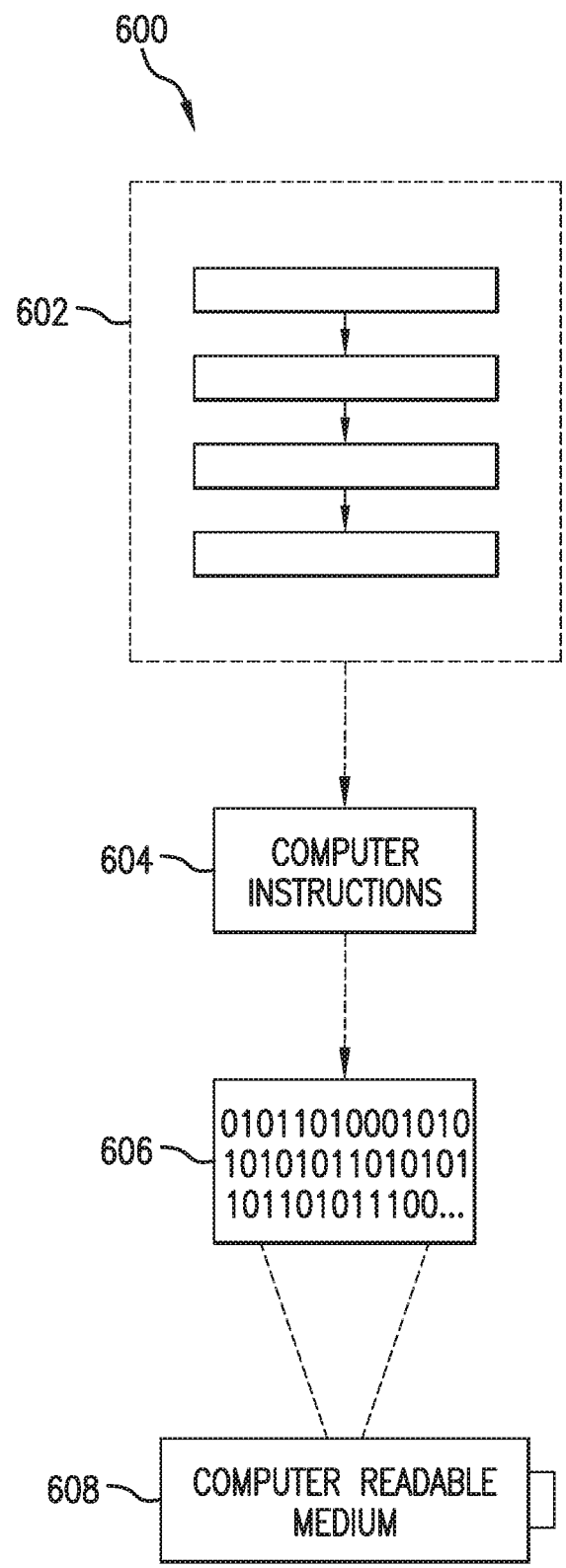
FIG. 6 is an illustration of an example computer-readable medium or computer-readable device including processor-executable instructions configured to embody one or more of the provisions set forth herein, according to one or more embodiments in accordance with one embodiment.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method 602, such as the method 500 of FIG. 5. In another embodiment, the processor-executable instructions 604 may be configured to implement a system, such as the system 130 or 150 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
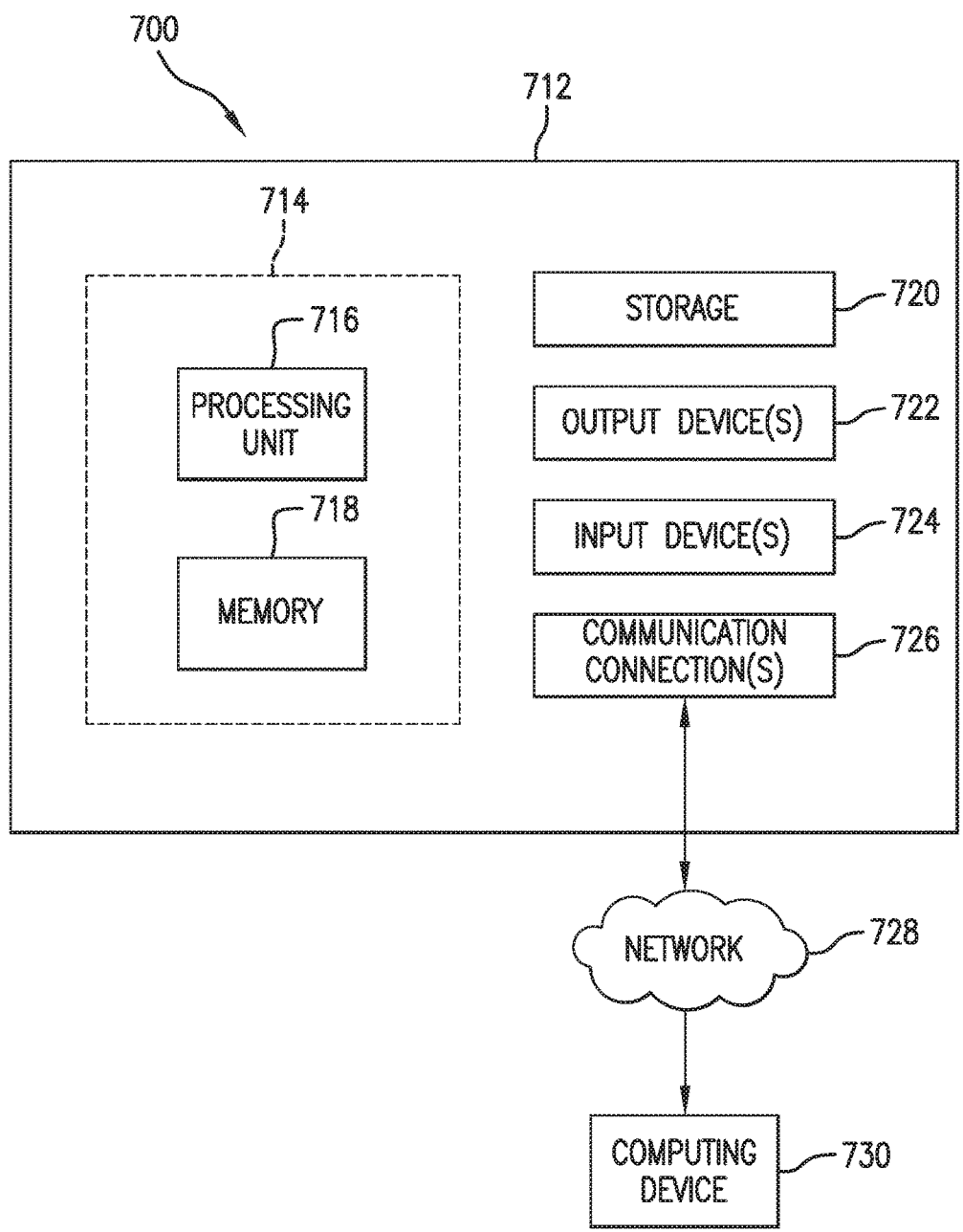
FIG. 7 is an illustration of an example computing environment where one or more of the provisions set forth herein are implemented, according to one or more embodiments in accordance with one embodiment.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one or more embodiments provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, device 712 includes additional features or functionality. For example, device 712 may include additional storage such as removable storage or non-removable storage, including, but not limited to, magnetic storage, optical storage, etc. Such additional storage is illustrated in FIG. 7 by storage 720. In one or more embodiments, computer readable instructions to implement one or more embodiments provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 712. Any such computer storage media is part of device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 712 includes input device(s) 724 such as keyboard, mouse, pen, voice input device, touch input device, infrared cameras, video input devices, or any other input device. Output device(s) 722 such as one or more displays, speakers, printers, or any other output device may be included with device 712. Input device(s) 724 and output device(s) 722 may be connected to device 712 via a wired connection, wireless connection, or any combination thereof. In one or more embodiments, an input device or an output device from another computing device may be used as input device(s) 724 or output device(s) 722 for computing device 712. Device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for managing demand response (DR) for an electric vehicle (EV), comprising:
   receiving a current location and a destination location for the EV;
   determining whether the EV is eligible to participate in a DR event;
   determining whether a travel route from the current location to the destination location is associated with a non-coverage area where a telematics control unit (TCU) of the EV has below a threshold level of connectivity with an original equipment manufacturer (OEM) server such that the EV cannot receive a DR signal therefrom, the DR signal comprising DR information associated with the DR event; and
   transmitting the DR signal as a DR request based on the EV being eligible to participate in the DR event, the EV having current coverage along the travel route, and the EV travelling towards the non-coverage area, wherein no DR signal is transmitted when the EV is travelling towards the non-coverage area and the EV is not eligible to participate in the DR event.

2. The method of claim 1, comprising determining whether the EV is eligible to participate in the DR event based on one or more DR criteria.

3. The method of claim 1, comprising determining a timing for transmitting the DR signal based on the current location of the EV and a location of the non-coverage area.

4. The method of claim 1, wherein the non-coverage area is defined based on a signal strength threshold.

5. The method of claim 1, comprising measuring a signal strength for the EV in relation to a network.

6. The method of claim 5, comprising generating a coverage pattern associated with the EV based on the signal strength for the EV and the current location of the EV.

7. The method of claim 1, comprising receiving a response to the DR request and storing the response.

8. The method of claim 1, wherein the DR information comprises a location, a date, a time, or a duration associated with the DR event.

9. The method of claim 1, comprising receiving a verification indicative of participation in the DR event by the EV.

10. The method of claim 1, wherein the DR event comprises delaying charging of the EV.

11. A system for managing demand response (DR) for an electric vehicle (EV), comprising:
   a coverage module:
      receiving a current location and a destination location for the EV; and
      determining whether a travel route from the current location to the destination location is associated with a non-coverage area where a telematics control unit (TCU) of the EV has limited connectivity with an original equipment manufacturer (OEM) server such that the EV cannot receive a DR signal therefrom, the DR signal comprising DR information associated with a DR event; and a DR module:
      determining whether the EV is eligible to participate in the DR event;
      transmitting the DR signal as a DR request based on the EV being eligible to participate in the DR event, the EV having current coverage along the travel route, and the EV travelling towards the non-coverage area, wherein no DR signal is transmitted when the EV is travelling towards the non-coverage area and the EV is not eligible to participate in the DR event.

12. The system of claim 11, wherein the DR module determines a timing for transmitting the DR signal based on the current location of the EV and a location of the non-coverage area.

13. The system of claim 11, wherein the coverage module receives a measured signal strength for the EV in relation to a network.

14. The system of claim 13, wherein the coverage module generates a coverage pattern associated with the EV based on the signal strength and the current location of the EV.

15. The system of claim 11, wherein the DR module receives a response to the DR request and stores the response.

16. The system of claim 11, wherein the DR information comprises a location, a date, a time, or a duration associated with the DR event.

17. The system of claim 11, wherein the DR module receives a verification indicative of participation in the DR event by the EV.

18. A method for managing demand response (DR) for an electric vehicle (EV), comprising:
   determining a current location and a destination location for the EV; and
   receiving a DR signal as a DR request based on the EV being eligible to participate in a DR event, the EV having current coverage along a travel route from the current location to the destination location, and the EV travelling towards a non-coverage area where a telematics control unit (TCU) of the EV has limited connectivity with an original equipment manufacturer (OEM) server, wherein no DR signal is received when the EV is travelling towards the non-coverage area and the EV is not eligible to participate in the DR event.

19. The method of claim 18, wherein the non-coverage area is defined based on a signal strength threshold.

20. The method of claim 18, comprising measuring a signal strength for the EV in relation to a network.

* * * * *